United States Patent [19]

Costa, Jr. et al.

[11] Patent Number: 4,991,346
[45] Date of Patent: Feb. 12, 1991

[54] SUPPORT AND WATERING ASSEMBLY FOR A PLANTING POT

[76] Inventors: Jose A. Costa, Jr., 22290 SW. 162nd Ave., Gould, Fla. 33170; Julian Gutierrez, 6205 SW. 116th St., Miami, Fla. 33156

[21] Appl. No.: 390,386

[22] Filed: Aug. 7, 1989

Related U.S. Application Data

[63] Continuation-in-part of Ser. No. 332,512, Apr. 3, 1989, which is a continuation-in-part of Ser. No. 243,500, Sep. 12, 1988.

[51] Int. Cl.⁵ .............................................. A01G 27/00
[52] U.S. Cl. ............................................. 47/80; 47/79
[58] Field of Search ........................... 47/79, 80, 81, 82

[56] References Cited

U.S. PATENT DOCUMENTS

| 1,450,633 | 4/1923 | Hudson | 47/81 |
| 2,865,137 | 12/1958 | Congacre | 47/80 |
| 4,171,593 | 10/1979 | Bigglestone | 47/79 |
| 4,184,287 | 1/1980 | Roth | 47/81 |
| 4,829,209 | 5/1989 | Centafanti | 47/79 |

FOREIGN PATENT DOCUMENTS

| 4005 | 1/1901 | Austria | 47/80 |
| 2701401 | 7/1978 | Fed. Rep. of Germany | 47/80 |
| 453258 | 6/1913 | France | 47/81 |
| 1420367 | 12/1965 | France | 47/79 |
| 12057 | of 1896 | United Kingdom | 47/81 |
| 2018115 | 10/1979 | United Kingdom | 47/79 |

Primary Examiner—Henry E. Raduazo
Assistant Examiner—Jerrold D. Johnson
Attorney, Agent, or Firm—Malloy, Downey & Malloy

[57] ABSTRACT

An assembly for holding a planting pot and supplying water or liquid thereto by capillary action from a liquid reservoir maintained in an outer container disposed in surrounding and supporting relation to the planting pot on the interior thereof. The assembly incorporates a capillary container holding transfer medium which facilitates liquid flow therethrough by capillary action, such as dirt or soil similar to the material on the interior of the planting pot in which the root structure of the contained plant grows.

8 Claims, 2 Drawing Sheets

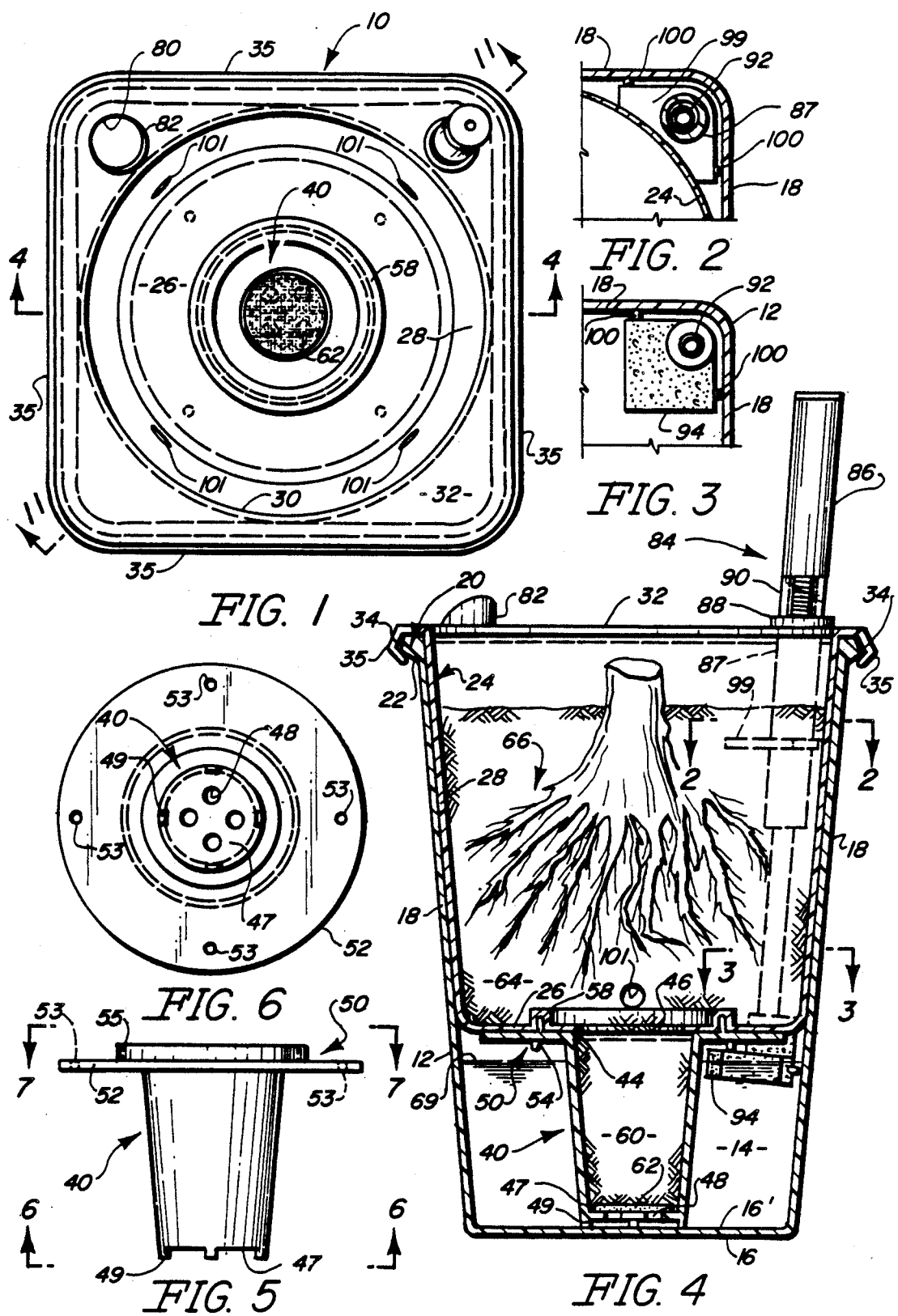

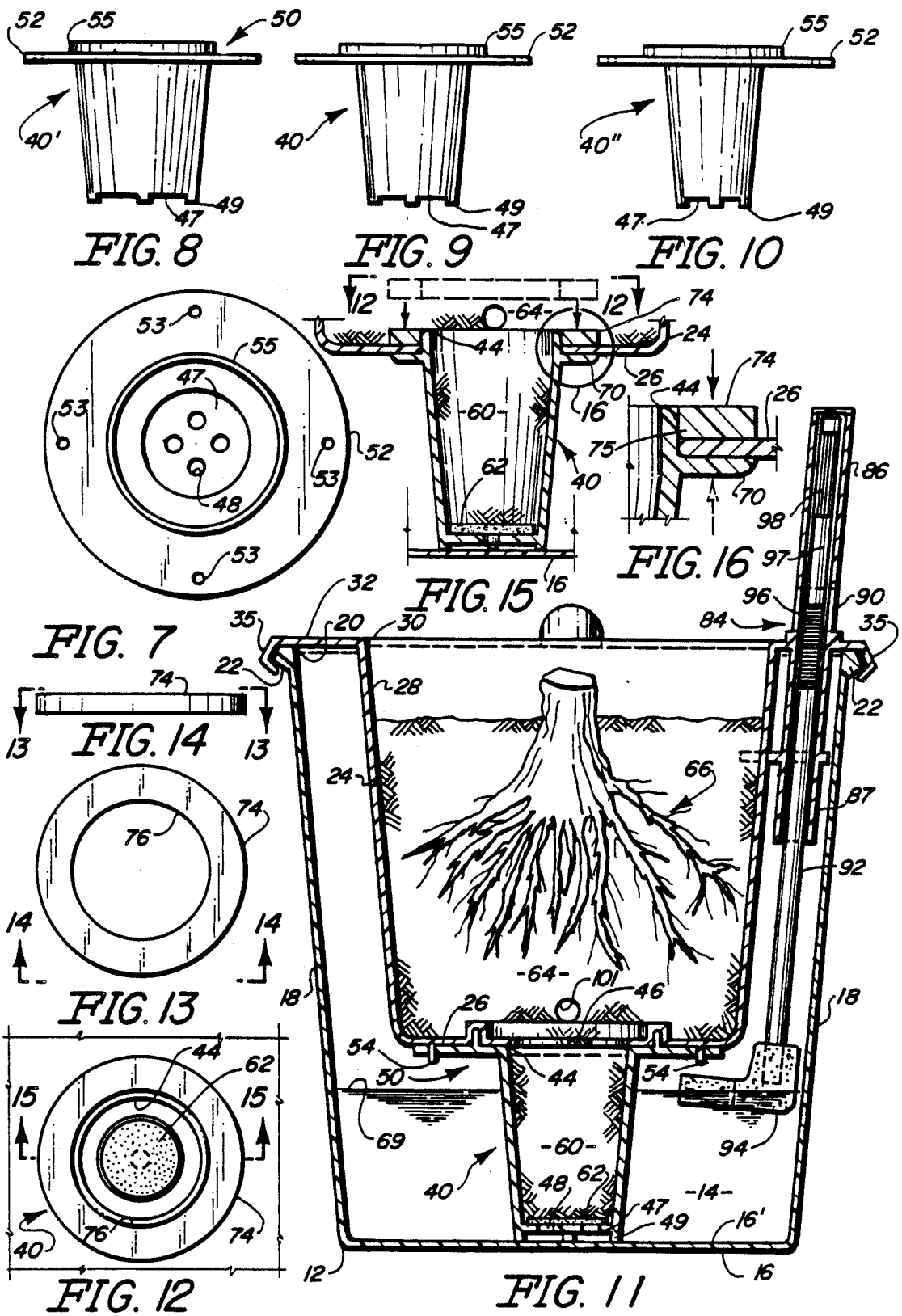

SUPPORT AND WATERING ASSEMBLY FOR A PLANTING POT

BACKGROUND OF THE INVENTION

This is a continuation-in-part application of presently co-pending U.S. patent application Ser. No. 332 512 filed Apr. 3 1989, which is a continuation-in-part of presently co-pending U.S. patent application Ser. No. 243,500 filed Sept. 12, 1988.

FIELD OF THE INVENTION

This invention relates to a structure for supporting a planting pot as well as the plant and root system on the interior thereof in a position for automatically feeding water or liquid from a liquid reservoir through capillary action to the root system as needed.

DESCRIPTION OF THE PRIOR ART

In the growing and maintenance of small plants within conventionally structured planting pots, there is a need to provide water or applicable nourishing liquid to the root system of the plant on a substantially continuous basis and in correct amounts. In order to avoid the disadvantages associated with manual watering, various "automatic" watering systems are known in the prior art. One such method of accomplishing proper watering of a plant within a conventional planting pot is through the use of a structure which facilitates transfer of liquid from a liquid reservoir or supply to the plant by means of capillary action. Such capillary action watering structures are shown in Farnham U.S Pat. No. 2,281,068; Keskitulo U.S. Pat. No. 2,554,302; Barstow U.S. Pat. No. 2,695,474; and Longacre U.S. Pat. No. 2,865,137.

Typically, a conventional planting pot includes a floor having a centrally located aperture which serves as a drain hole. A surrounding sidewall normally includes vents adjacent the floor and spaced from the drain hole. For purposes of aesthetics, it is typical for such a planting pot to be placed on the interior of a larger, outer container or pot which may be more decorative and also which may be structured to contain a liquid reservoir or supply of water or irrigating liquid therein.

It is generally considered to be harmful to place the planting pot within an outer container or pot such that the lower portion of the planting pot is submerged within the supply of water or irrigating liquid maintained within the outer container. The result could be an over-watering which would frequently result in root-rot. To the contrary, it is desirable to maintain the planting pot out of direct contact with the supply of liquid maintained within the outer container. It is desirable, however, to otherwise position the planting pot and the root system contained therein in "fluid communication" with a supply or reservoir of water. Therefore, proper watering, as needed, is automatically accomplished. A path of liquid flow from the liquid reservoir to the growing medium or soil in which the root system of the plant is retained is accomplished through capillary action.

It is quite common for the outer containers to vary in size, shape, configuration, etc. depending upon the preference of the user or grower. In certain instances, the specific shape of the outer container does not lend itself to the most efficient use of space during packaging or shipping; for example, when the shape of the outer container is circular rather than square or rectangular. To the contrary, however, the majority of conventionally structured and dimensioned planting pots are normally cylindrical and include a substantially round or circular transverse, cross-sectional configuration. As set forth above, such a conventionally configured planting pot, when shipped in a collective array, serves to waste space which would not be wasted if in fact such container were shipped with the outer container and in fact, the outer container had a square or rectangular configuration. However, such a configuration is generally considered to be necessary in order to accomplish re-potting of a plant, as from one round container to another.

Accordingly, certain recognized problems in the industry may very well be overcome by a combination planting pot serving to retain the root system within a growing medium on the interior thereof and further, wherein the planting pot is used in combination with an outer container which serves to house and maintain a liquid reservoir in a lower portion thereof and further, wherein an additional structure may be utilized in combination with both the planting pot and the outer container for purposes of establishing an automatic path of liquid flow from the liquid reservoir to the root system on the interior of the planting pot by the preferred method of capillary action.

SUMMARY OF THE INVENTION

The present invention relates to an assembly for the support of a planting pot having a growing medium, such as dirt, soil, etc. supporting a root system of a plant wherein the assembly of the present invention is further structured to accomplish automatic watering of the root system of the plant. Watering occurs through the provision of capillary action due to cooperative structure adapted to accomplish such watering. Through capillary action, liquid is delivered to the root system in the planting pot from a liquid reservoir maintained in the bottom interior of an outer container which supports the planting pot on the interior thereof.

In conventional use, planting pots normally have a round or circular cross-sectional configuration. However, such planting pots are not best suited, due to their circular configuration, for shipping, transporting or storing since lost space is clearly present. However, due to their extensive use, round planting pots are utilized in the present invention in order to facilitate "instant" re-potting. But, the problem of wasted space is overcome in the structure of the assembly of the present invention through the provision of the outer container, defining a liquid reservoir therein having a rectangular or preferably a square cross-sectional configuration and dimensioned to receive the planting pot on the interior thereof. Support of the planting pot within the outer container is accomplished preferably by a lid structure integrally or fixedly attached to the planting pot adjacent to and extending outwardly from an access opening defined at the upper end thereof. The periphery of the outer container is gripped due to the peripheral configuration of the lid structure secured to the planting pot.

An important feature of the present invention is the existence of a capillary container removably secured by connecting means to the bottom of the planting pot in aligned registry with an aperture formed therein. The aperture in the bottom of the planting pot is to allow liquid flow to pass therethrough to the growing medium supporting the root system on the interior of the planting pot. A similar soil, dirt or like transfer medium which facilitates apillary action therethrough is placed within the capillary container in direct contact with the growing medium within the planting pot. The lower end of the capillary container is also apertured and disposed in at leas t partially submerged relation to the liquid in the lower end of the container defining the liquid reservoir. Due to capillary action, the transfer medium within the capillary container will effectively "absorb" the liquid within the liquid reservoir of the outer container. Demand of the root system of the plant within the planting pot will further cause, through capillary action, the upward travel or flow of liquid through the growing medium (soil, dirt, etc.) to the root system due to the direct contact between the growing medium within the planting pot and the transfer medium within the capillary container. The size of the planting pot or more particularly the interior volume thereof may be varied depending upon water demands of the plant maintained within the planting pot and supported within the outer container. Further, the aforementioned connecting means used to removably attach the capillary container to the bottom of the planting pot will be commonly dimensioned and configured so that a plurality of such capillary containers may be interchanged and connected to the bottom of the planting pot wherein various ones of the capillary containers may have a different volume and therefore a different rate or quantity of liquid transfer to the root system.

Other features associated with the assembly of the present invention is the existence of a signal type device having a generally elongated configuration with a float structure secured to the lower end thereof and disposed to travel generally with the upper level of the liquid within the liquid reservoir. Adjacent the upper end of the signal device would be a color coded segment visually observable through a window or like structure wherein the level and accordingly, the observable color of the signal structure would be indicative of the quantity of water still maintained within the outer container and available for automatic watering and when to add and when to stop adding water. Other features which may be incorporated within the subject assembly would be all or a portion of the outer container formed from a transparent or translucent material so as to allow direct visual observation of the liquid within the liquid reservoir.

Due to the fact that the planting pot has an apertured bottom, water can be delivered therethrough through a capillary wick type structure as disclosed in other inventions by the inventor herein rather than by direct capillary action through a transfer medium maintained within a capillary container as set forth in greater detail hereinafter.

BRIEF DESCRIPTION OF THE DRAWINGS

For a fuller understanding of the nature of the present invention, reference should be had to the following detailed descriptions taken in connection with the accompanying drawings in which:

FIG. 1 is a top plan view of the assembly of the present invention.

FIG. 2 is a sectional view in partial cut-away 10 showing details of the signal structure along line 2—2 of FIG. 4.

FIG. 3 is a sectional view in partial cut-away along line 3—3 of FIG. 4.

FIG. 4 is a longitudinal sectional view along line 4—4 of FIG. 1.

FIG. 5 is a front plan detailed view of a capillary container portion of the present invention.

FIG. 6 is a bottom view along line 6—6 of FIG. 5.

FIG. 7 is a top plan view along line 7—7 of FIG. 5.

FIGS. 8, 9, and 10 are front plan views of capillary containers similar to that of FIG. 5, but each having a different dimension and capacity.

FIG. 11 is a longitudinal sectional view along line 11—11 of FIG. 1.

FIG. 12 is an end view of another embodiment of the present invention along line 12—12 of FIG. 15.

FIG. 13 is a top end view along line 13—13 of FIG. 14.

FIG. 14 is an end view along line 14—14 of FIG. 13.

FIG. 15 is a sectional view in partial cut-away showing details of the embodiment of FIGS. 12 through 14.

FIG. 16 is a sectional view in partial cut-away of the detail of line 16 of FIG. 15.

Like reference numerals refer to like parts throughout the several views of the drawings.

DETAILED DESCRIPTION OF THE PREFERRED EMBODIMENT

As shown in the accompanying figures, the present invention relates to a support and watering assembly generally indicated as 10 and including an outer container 12 having a substantially hollow interior and further including space for a liquid reservoir 14 on the lower interior thereof as shown in FIGS. 4 and 11. The outer container 12 includes a base 16 and a plurality of continuously disposed sidewalls 18 preferably defining a rectangular or more specifically, a square cross-sectional configuration. An open mouth 20 is disposed oppositely to the base 16 and is surrounded by a peripheral rim or lip as at 22. The container 12 is cooperatively dimensioned so as to allow placement and support on the interior thereof of a planting pot 24. The planting pot is preferably of a circular or round cross-sectional configuration but preferably has an outside diameter, substantially equal to the space between 28 oppositely disposed interior surfaces of sidewalls 18 and 18' as shown in FIG. 4.

The planting pot 24 has a bottom 26 and a continuously surrounding cylindrical sidewall 28, as well as an access opening 30 oppositely disposed to the bottom 26 and more specifically defined by a supporting lid structure 32. As clearly shown in both FIGS. 4 and 11, the lid 32 extends radially outward from the access opening 30 and extends beyond the peripheral lip 22 of the outer container 18. Further, an interior channel or the like as at 34 is formed generally on the outer peripheral edge 35 of the lid structure 32 and is particularly configured so as to removably connect in a "snap-fit" type of attachment to the peripheral lip 22. In a preferred embodiment, the lid structure 32 is integrally attached to the upper end of the planting pot 28 and due to its removable attachment to the peripheral 22 of the outer container 12, the planting pot is adequately supported on the interior of the outer container 12 as clearly shown An important feature of the present invention is the provision of a capillary container generally indicated as 40. The capillary container 40 includes a lower end 42 which is apertured and an open upper end 44 which is positionable in aligned, communicating relation with an aperture 46 formed in the bottom of the planting pot as clearly shown. The capillary container 40 is removably attached to the bottom 26 of the planting pot by a connecting means generally indicated as 50, to be described in greater detail hereinafter. The lower end of the capillary container is also apertured as at 48 and further includes a spacer structure 49 projecting downwardly from the lower end 47 in order to maintain a spaced relation between the lower end 47 and the base 16 in order that water or liquid freely flows from the liquid reservoir 14 through the apertures 48 into the interior of the capillary container 40 and to the transfer medium 60 contained therein A felt or like porous material member as at 62 may be disposed in overlying relation to the inner surface of the lower end 47 of capillary container 40 in covering relation to the apertures 48. This is so disposed as to prevent passage or emptying of the transfer medium 60 through the apertures 48. The transfer medium 60 is preferably defined by a soil, dirt or like growing medium similar to the soil, dirt or growing medium 64 on the interior of the planting pot 24 in which the root system generally indicated as 66 grows Accordingly, in operation liquid or water maintained in the lower end of the outer container 12 and defining the liquid reservoir 14 is sufficient in quantity to at least cover the lower end 47 of the capillary container 40. Due to the existence of the apertures 48, such liquid or water passes into the interior of the capillary container 40, by capillary action, passing first through the felt or like porous material cover 62 and then through the transfer medium 60 maintained on the interior of the capillary container 40. Due to the fact that the transfer medium 60 is in direct contact with the growing medium 64 by virture of the alignment between the open upper end 44 of the capillary container 40 and the aperture 46 in the bottom 26 of the planting pot, the water will be delivered continuously through capillary action transfer from the interior of the container or the liquid reservoir 14 through the capillary container 40 and then into the interior of the planting pot 26 to the root system 66.

In order to avoid excess watering or exposure of the growing medium 64 and root system 66, the upper level of the liquid as at 69 is maintained in spaced relation beneath the bottom 26 of planting pot 24 and the aperture 46 therein. By virtue of this spaced relation, the supply of water from the liquid reservoir 14 to the root system 66 can only occur by capillary action through the transfer medium 60 in capillary container 40 and the growing medium 64 supporting the root system 66 within the planting pot 24. With reference to FIGS. 8, 9 and 10, it should be noted that the capacity or volume of the capillary container 40 may, in fact, vary by changing the size thereof as evidenced by the different sizes in the embodiments of FIGS. 8 and 10 indicated as 40' and 40". However, regardless of the capacity or size of the capillary container 40, 40', 40", it is important to note that the connecting means or a portion thereof as at 50 associated with the capillary containers is maintained at a common size so that any one of a plurality of capillary containers can be interchanged by their removable connection to the bottom 26 of the planting pot 24.

More specifically, in one embodiment, the connecting means 50 comprises an outwardly, radially extending flange 52 secured to and extending outwardly from the upper open end 44 of the capillary container 40. This flange 52 includes at least one but preferably a plurality of apertures or openings 53 formed therein in spaced apart relation to one another. Each of these openings 53 is designed to frictionally receive therein one of a plurality of downwardly extending connector elements 54 formed on the under surface of the base 26 of the planting pot 24. The connector means 50 further includes an upwardly extending, continuous and preferably annular projection 55 formed on an upper surface of the flange 52 and configured, disposed and dimensioned to fit within a congruently configured receiving channel 58 integrally formed in base 26 as best shown in FIGS. 4 and 11. The receiving of the connector elements 54 within apertures 53 of flange 52 and the receiving of the upward projection 55 within the annular receiving channel 58, all by frictional engagement, serves to maintain a firm connection between the capillary container 40 and the bottom 26 of the planting pot 24 in a manner which aligns the upper open end 44 of the capillary container 40 with the aperture 46 formed in the base 26 in order to establish flow of liquid to the roots, by capillary action, from the liquid reservoir 14.

Yet another embodiment of the connecting means is shown in FIGS. 12 through 16. This embodiment comprises a radially outward extending flange 70 integrally secured to the capillary container 40 in spaced relation to the upper open end 44 thereof, (see FIGS. 15 and 16). This flange 70 is disposed to engage the under surface of the bottom 26 of the planting pot 24 in the manner clearly shown. The periphery of the upper open end 44 and the adjacent upper portion thereof is dimensioned to fit within the aperture 46 formed in the base 26 of the planting pot 24 so as to extend into the interior thereof. In such a position, the transfer medium 60 within the capillary container 40 is maintained in direct contact with the growing medium 64 so that the liquid or water will be transferred through capillary action directly to the root system 66 as explained above. However, in order to maintain the capillary container 40 in the position shown in FIG. 15, a locking ring 74 is disposed on the interior of the planting pot 24 in surrounding, concentric relation to the upper portion of the capillary container 40 immediately adjacent the periphery of the upper open end 44. The central opening 76 of the locking ring 74 is specifically dimensioned to frictionally engage the exterior surface of the container generally at the junction 75 as shown clearly in FIG. 16. Therefore, the engaged portion of the bottom 26 of the planting pot 24 is effectively sandwiched between the locking ring 74 and the radially extending flange 70 by opposite forces being exerted thereon as indicated by the directional arrows of FIG. 16.

In either embodiment of the locking means, the fact that the outer projections 49 on the lower end 47 of the capillary container 40 effectively engage the interior surface 16' of the base 16 as shown in both FIGS. 4 and 11.

Other features of the present invention include an opening and a secured spout as at 80 and 82 respectively provided in the lid structure 32 and disposed to allow the entry of water into the interior of the outer container 12 to define the liquid reservoir as at 14.

Yet another feature of the present invention is an indicating means generally indicated as 84 and including a hollow elongated sleeve 86 having an outer portion secured to the lid structure 32 and extending upwardly and outwardly therefrom as at 88. The outer portion of the sleeve 86 includes a window as at 90 through which an interior stem, or at least a portion thereof, can be viewed. The stem 92 has a float structure 94 secured to the lower end thereof which is in direct contact with the liquid or water within the liquid reservoir 14. The existence of the float 94 on the upper level 69 of the liquid reservoir 14 causes travel of the stem 92 longitudinally within the interior of the sleeve 86 and 87 as the level of water 69 changes within the interior of the outer container 12. Therefore, an observer can readily determine the capacity of the liquid reservoir 14 by viewing a color coded segment 96, 97, 98 through the open window 90. Depending upon the color visually observable through the window 90, a user of the subject assembly will be able to determine adequacy of the amount of liquid within the liquid reservoir 14 and more specifically, when to add and when to stop adding water.

Structural features associated with the indicator means 84 include a spacer mechanism 99 disposed in confronting relation between the planting pot 24 (see FIGS. 2 and 11) and the interior surface of the sidewalls 18. Spacing fingers 100 are provided as shown on the spacer 99 and the float structure 94 Further, the shape of both the float structure 94 and the spacer structure 99 are such as to conform to the interior square or rectangular configuration of the outer container 12 and, in the case of the spacer structure 99, the exterior cylindrical configuration of the planting pot 24. The float structure 94 as best shown in FIG. 3 has a somewhat square configuration in order to conform to the overall square or rectangular cross-sectional configuration of the outer container 12. This configuration enables the use of a somewhat larger float structure than normally provided. In turn, the larger size of the float structure 94 provides a quicker and possibly more accurate response as to the position of the upper level 69 of the liquid reservoir 14 thereby providing a more accurate indication as to when to add water and when to stop adding water to the interior of the container 12.

Yet another feature of the present invention is the ability for the storage, using a minimum amount of space, for a large number of each of the components including the outer container 12, the planting pot 24 and the capillary container 40 in a respectively nested or stacked arrangement. This is important due to the extremely large number of such pots or containers which must be kept on hand by a nursery or like facility.

Yet other features of the present invention include the provision of venting apertures or holes 101 formed in the planting pot 24 and provided to vent air to the root system 66 and growing media 64.

Now that the invention has been described,
What is claimed is:

1. An assembly designed to contain and provide water to the root system of a plant, comprising:
   a. an outer container having a base and surrounding side walls defining a hollow interior and terminating in an open mouth oppositely disposed to said base,
   b. a planting pot dimensioned and configured to be disposed in said outer container and including a bottom disposed in spaced relation to said base,
   c. a capillary container connected to said bottom and disposed in depending relation therefrom towards said base,
   d. a liquid reservoir maintained within said outer container and defined by a sufficient quantity of liquid to submerge a lower end of said capillary container and having an upper level of the liquid reservoir maintained beneath and in spaced relation to said bottom of said planting pot,
   e. said capillary container filled with a transfer medium and including said lower end being apertured and defining fluid communication between the liquid reservoir and the capillary container interior,
   f. said bottom of said planting pot being apertured and including connecting means removably attaching said capillary container to said bottom in aligned communicating relation between said apertured bottom in aligned communicating relation between said apertured bottom of said planting pot and an open upper end of said capillary container,
   g. said connecting means including a flange member secured to and extending radially outward from said open upper end of said capillary container and removably engageable with an under surface of said bottom of said planting pot wherein said flange member comprises a plurality of receiving apertures formed therein and each disposed to removably receive one of a plurality of connector elements therein, said plurality of connector elements formed on an under surface of said bottom of said planting pot,
   h. said connecting means further including an upwardly directed protrusion formed on said flange and a congruently configured receiving channel disposed and dimensioned to removably receive said protrusion therein in frictional engagement therewith,
   i. the transfer medium within the interior of said capillary container disposed in contact with soil supporting the root system of a plant within said planting pot, and
   j. said capillary container and planting pot relatively disposed to said hollow interior of said outer container to define transfer of liquid from said liquid reservoir by capillary action from the hollow interior through said transfer medium to the root system within said planting pot.

2. An assembly designed to contain and provide water to the root system of a plant, comprising:
   a. an outer container having a base and surrounding side walls defining a hollow interior and terminating in an open mouth oppositely disposed to said base,
   b. a planting pot dimensioned and configured to be disposed in said outer container and including a bottom disposed in spaced relation to said base,
   c. a capillary container connected to aid bottom and disposed in depending relation therefrom towards said base,
   d. a liquid reservoir maintained within said outer container and defined by a sufficient quantity of liquid to submerge a lower end of said capillary container and having an upper level of the liquid reservoir maintained beneath and in spaced relation to said bottom of said planting pot,
   e. said capillary container filled with a transfer medium and including said lower end being apertured and defining fluid communication between the liquid reservoir and the capillary container interior,
   f. said bottom of said planting pot being apertured and including connecting means removably attaching said capillary container to said bottom in aligned communicating relation between said apertured bottom of said planting pot and an open upper end of said capillary container,
   g. said connecting means including a flange member secured to and extending radially outward from said upper end of said capillary container and removably engageable with an under surface of said bottom of said planting pot, wherein said connecting means including a flange disposed below a periphery of said open end of said capillary container and said apertured bottom of said planting pot dimensioned to receive said periphery of said open end therethrough to the interior of said planting pot and a connecting ring disposed on the interior of said planting pot in concentric, surrounding and removably frictional engagement with an exterior surface of said capillary container adjacent said open end thereof.

h. the transfer medium within the interior of said capillary container disposed in contact with soil supporting the root system of a plant within said planting pot, and i. said capillary container and planting pot relatively disposed to said hollow interior of said outer container to define transfer of liquid from said liquid reservoir by capillary action from the hollow interior through said transfer medium to the root system within said planting pot.

3. An assembly as in claim 1 or 2, wherein said planting pot comprises a substantially circular cross-sectional configuration and said outer container comprises a multi-sided cross-sectional configuration.

4. An assembly as in claim 3, wherein said planting pot comprises an outside diameter substantially equal to the distance between inner surfaces of two opposing sidewalls of said outer container.

5. An assembly as in claim 4, wherein said multi-sided cross-sectional configuration is defined by a rectangular configuration.

6. An assembly as in claim 1 or 2, further comprising a lid structure fixedly secured to an outer periphery of an access opening of said planting pot and extending outwardly therefrom into removable connecting engagement with said periphery of said open mouth.

7. An assembly as in claim 6, wherein said lid structure and said planting pot comprise an integral, one-piece construction and said lid structure comprises a central aperture coaxial to said access opening of said planting pot and dimensioned to allow passage of the plant therethrough from its root system within said planting pot.

8. An assembly as in claim 6, wherein said lid structure comprises a watering hole formed therein and disposed to pass water into said outer container on the exterior of said planting pot.

* * * * *